United States Patent
Klaus et al.

(10) Patent No.: US 7,413,417 B2
(45) Date of Patent: Aug. 19, 2008

(54) MOTOR VEHICLE DRIVE ARRANGEMENT

(75) Inventors: Andreas Klaus, Chemnitz (DE); Tobias Ostertag, Herrenberg (DE)

(73) Assignee: Daimler AG, Stuttgart (DE)

( * ) Notice: Subject to any disclaimer, the term of this patent is extended or adjusted under 35 U.S.C. 154(b) by 407 days.

(21) Appl. No.: 11/110,981

(22) Filed: Apr. 20, 2005

(65) Prior Publication Data
US 2005/0265858 A1 Dec. 1, 2005

Related U.S. Application Data

(63) Continuation-in-part of application No. PCT/EP03/11866, filed on Oct. 25, 2003.

(30) Foreign Application Priority Data
Nov. 2, 2002 (DE) .............................. 102 51 042

(51) Int. Cl.
F04B 17/00 (2006.01)
F04B 35/00 (2006.01)

(52) U.S. Cl. ................. 417/366; 417/364; 417/374; 903/927; 903/948; 903/951; 416/174; 416/180; 415/111

(58) Field of Classification Search ............... 417/364, 417/366, 374; 180/62.5; 190/70.12; 415/111; 416/174, 180; 903/927, 948, 951
See application file for complete search history.

(56) References Cited

U.S. PATENT DOCUMENTS 6,592,486 B1 *  7/2003  Arbanas et al. ............... 475/84
6,863,140 B2 *  3/2005  Noreikat et al. ............ 180/65.2
2003/0127262 A1 *  7/2003  Noreikat et al. ............ 180/65.2
2005/0169773 A1 *  8/2005  Schwarz et al. ............. 417/310
2005/0244284 A1 * 11/2005  Kolb ........................... 417/366

FOREIGN PATENT DOCUMENTS

| DE | 196 04 517 A1 | 8/1997 |
| DE | 196 15 929 A1 | 10/1997 |
| DE | 197 50 675 C1 | 8/1998 |
| DE | 199 23 154 A1 | 11/1999 |
| DE | 199 31 400 C2 | 1/2001 |
| DE | 10251041 A1 * | 5/2004 |
| EP | 0 559 342 A2 | 9/1993 |
| EP | 1 302 704 A2 | 4/2003 |
| WO | WO 2004042258 A1 * | 5/2004 |

* cited by examiner

*Primary Examiner*—Devon Kramer
*Assistant Examiner*—Leonard J Weinstein
(74) *Attorney, Agent, or Firm*—Klaus J. Bach

(57) ABSTRACT

In a motor vehicle drive arrangement oil is supplied to a drive gear mechanism and other drive elements by an oil pump which is driven only by an electric motor and is arranged in a space in which one or more torque transmission devices such as a hydrodynamic torque converter, an operable drive clutch and at least one electric motor for forming a hybrid drive are disposed and which is formed between the oil pump and electric motor, on the one hand, and the vehicle travel drive motor on the other, the oil pump is disposed around a shaft transmitting the drive torque to the transmission and is surrounded by the electric motor driving the pump.

17 Claims, 3 Drawing Sheets

MOTOR VEHICLE DRIVE ARRANGEMENT

This is a Continuation-In-Part Application of International Application PCT/EP03/11866 filed Oct. 25, 2003 and claiming the priority of German application 102 51 042.3 filed Nov. 2, 2002.

BACKGROUND OF THE INVENTION

The invention relates to a motor vehicle drive arrangement with a variable transmission ratio including an oil pump for providing pressurized oil for actuating gear shift elements and an electric motor for driving the oil pump.

DE 199 23 154 A1 discloses a motor vehicle drive device of this type in which an oil pump is connected to an electric motor via a freewheeling mechanism, and to a traveling drive train via another freewheeling mechanism. As a result, the oil pump is driven either by the electric motor or the traveling drive train as a function of the rotational speed. Only a very small amount of installation space is available in the engine cavity of motor vehicles so that it is difficult to accommodate the two freewheeling mechanisms and the electric motor.

In practice, motor vehicle drive devices are known whose vehicle travel drive train (motor vehicle drive train) includes an internal combustion engine and an automatic transmission arranged axially one behind the other, with the automatic transmission containing a hydrodynamic torque converter and a mechanical drive gear mechanism which contains planetary gearwheel sets and operating elements for shifting the planetary gearwheel sets. The torque converter is located axially between the internal combustion engine and the mechanical drive gear mechanism. In order to operate the shifting elements (clutches and/or shifting brakes) and in order to cool the mechanical drive gear mechanism and to supply oil to the torque converter, an oil pump is provided which can be driven by the traveling drive train via a mechanical drive connection.

The oil pump is located axially between the torque converter and the mechanical drive gear mechanism, and surrounds a drive shaft.

EP 0 559 342 A2 discloses a vehicle with an automatic transmission which is supplied by an oil pump which is driven by an electric motor. Neither the electric motor nor the oil pump have a mechanical drive connection to the traveling drive train. The drive motor and the electric motor are arranged in such a way that a converter lockup clutch is positioned axially between them.

In order to reduce consumption and emissions, in future a start/stop operating mode of an internal combustion engine will have to be accommodated, for example at traffic lights in towns. In order to start the internal combustion engine conveniently, suitable starter/generators and various hybrid systems (vehicle drive systems containing at least two different drive motors, for example an internal combustion engine and at least one electric motor) have already been developed.

The oil pump of the known automatic transmissions is driven by means of the pump wheel of the torque converter, which wheel is coupled permanently to the crankshaft of the internal combustion engine. As a result, when the internal combustion engine is switched off the oil pump cannot be driven so that, when the internal combustion engine is shut down, the oil pressure for operating the shifting elements (clutches and possibly shifting brakes) and for lubrication cannot be maintained. As a result, it is not possible to start up the motor vehicle again quickly after the internal combustion engine has been stopped. In this context, when starting up the motor vehicle it is necessary to wait, after the internal combustion engine has started, until the oil system of the automatic transmission has filled and a sufficiently high oil pressure level has built up in order to activate the shifting elements. This is counter to the current requirement for convenience. The requirement for convenience could be satisfied by driving the oil pump in accordance with the abovementioned DE 199 23 154 A1 or by providing an additional oil pump which is driven, when required, by an electric motor in order to maintain the oil supply and the oil pressure while the internal combustion engine is shut down. However, both solutions fail in most motor vehicles due to the fact that there is not sufficient installation space available in them and/or the existing components of the motor vehicle drive train would have to be changed, which would be very expensive and would also prevent series fabrication of various vehicles using identical components or identical assemblies.

It is the object of the invention to provide a drive device, in particular for passenger cars, in such a way that the amount of oil which is necessary to start up and drive the motor vehicle and the oil pressure which is necessary for this is present in the motor vehicle drive gear mechanism immediately after the vehicle drive unit, which may be an internal combustion engine or an electric motor or some other type of motor, starts up, without more, or significantly more, installation space being required. This object should be achieved in such a way that the solution can also be used for different types of known vehicles which are series-manufactured, without requiring a large degree of technical complexity or financial expenditure.

SUMMARY OF THE INVENTION

In a motor vehicle drive arrangement oil is supplied to a drive gear mechanism and other drive elements by an oil pump which is driven only by an electric motor and is arranged in a space in which one or more torque transmission devices such as a hydrodynamic torque converter, an operable drive clutch and at least one electric motor for forming a hybrid drive are disposed and which is formed between the oil pump and electric motor, on the one hand, and the vehicle travel drive motor on the other, the oil pump is disposed around a shaft transmitting the drive torque to the transmission and is surrounded by the electric motor driving the pump.

As the oil pump is driven only by an electric motor, the oil pump and its electric motor can be integrated into the housing of the drive device, for example into the housing of an automatic transmission, composed of a hydrodynamic torque converter and a mechanical transmission component.

The oil pump as it is used in contemporary passenger cars can be retained. According to the invention, however, it is no longer driven mechanically but only electrically. The electric motor is thus integrated in the housing in such a way that only small changes, or no changes, to the known drive device are necessary. Depending on the design, a short extension of the converter housing may become necessary in order to provide additional installation space. However, there is no need for installation space for an additional external oil pump.

As a result of the direct integration of the oil pump and of its electric motor into the drive train of the motor vehicle, less installation space is required than if an additional, electrically driven oil pump were to be used as well as the previous oil pump which was only driven mechanically.

The sealing of the oil ducts is also simplified. No additional lines have to be installed. The exchange of oil with the drive gear mechanism can be carried out via the ducts which have also already been provided for that purpose, in existing passenger cars.

In addition it is possible to control the pump according to requirements by the purely electric drive. As a result, an effective saving of fuel is possible. In the conventional oil pump, the oil stream which is delivered depends solely on the rotational speed of the internal combustion engine. At high rotational speeds, more oil is delivered than necessary. This overproduction is reduced by the electric drive, as a result of which the losses are considerably reduced.

According to one particular embodiment of the invention there is provision that the oil pump and its electric motor are arranged on the transmission input side of the drive gear mechanism, and in that a spacer region is provided between the arrangement of the oil pump and of its electric motor, on the one hand, and the vehicle drive motor, on the other, said spacer region having the purpose of positioning at least one torque transmission device in the traveling drive train. The torque transmission device has at least one of the elements comprising a clutch, torque converter and/or at least one further electric machine, and this element can be positioned in the spacer region. The further electric machine can be connected to the vehicle drive train so as to serve as an electric motor and as a generator.

As a result, the drive device can be used in a module system with which various motor vehicles, in particular passenger cars, can be so equipped.

Preferred embodiments of the invention will be described below with reference to the accompanying drawings:

DESCRIPTION OF PREFERRED EMBODIMENTS

The drive device of the invention has advantages in particular in passenger cars since the spatial conditions are particularly restricted there. However, the invention can also be used for any other type of motor vehicle.

Figure 1:
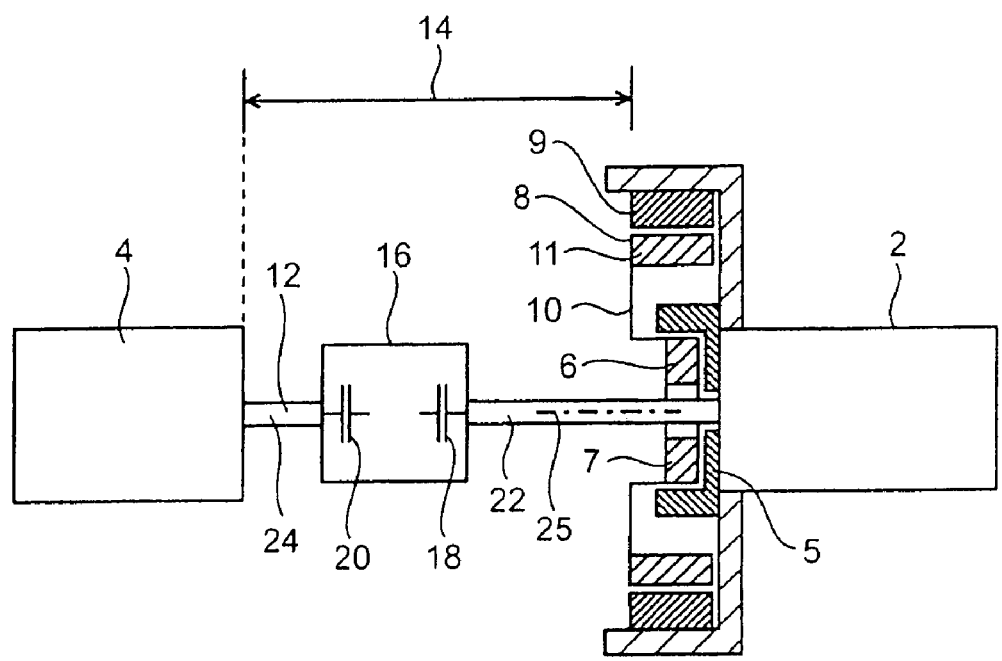
FIG. 1 is a schematic side view of a motor vehicle drive device according to the invention.

As shown in FIG. 1, the drive device of the invention contains a motor vehicle drive gear mechanism 2 with a variable transmission ratio for transmitting torque in a drive train between a vehicle travel drive motor 4 and at least one motor vehicle wheel. An oil pump 6 can be driven by an electric motor 8 in order to supply the drive gear mechanism 2 with pressurized oil in order to operate shifting elements of the drive gear mechanism and to cool the drive gear mechanism 2.

The electric motor 8 of the oil pump 6 may be an internal rotor-type motor or an external rotor-type motor. In the embodiments shown in FIGS. 1, 2 and 3, the motor is an internal-rotor type which has a rotor 11 within a fixed stator 9.

The oil pump 6 has a pump housing 5 which is arranged in a nonrotating fashion, and a pump rotor 7 which is connected fixed in terms of rotation to the rotor 11 of the electric motor 8 by a permanently closed mechanical drive connection 10.

The traveling drive motor 4 and the drive gear mechanism 2 are arranged axially with respect to one another along an axis 25 of rotation and are connected, or can be connected, to one another in terms of drive by means of an intermediate drive train 12.

The oil pump 6 and the electric motor 8 are arranged on the transmission input side of the transmission 2 around the axis 25 of rotation of the intermediate drive train 12. A spacer region 14 for positioning at least one torque transmission device 16 in order to transmit torque into the intermediate drive train 12 is provided between the arrangement of the oil pump 6 and its electric motor 8, on the one hand, and the vehicle travel drive motor 4, on the other. The torque transmission device 16 has at least one of the elements comprising a switchable vehicle drive clutch, a torque converter or at least one other electric machine, this element being arranged in the spacer region 14. If the element is a hydrodynamic torque converter, it can then form, together with the drive gear mechanism 2, an automatic transmission. In this case, the drive gear transmission 2 can have shifting elements in the form of clutches and/or shifting brakes for shifting gear speeds. If the element is a vehicle drive clutch, the drive gear mechanism 2 may be a manually shiftable transmission or an automatically shiftable transmission. In addition, or instead of this, the element can be, or can have, at least one or more other electric machines which are connected, or can be connected, in terms of drive to the intermediate drive train 12. This other electric machine may be an electric motor in order to drive the drive gear mechanism 2 alone or in addition to the vehicle travel drive motor 4. In addition, the other electric machine may be embodied in such a way that it can also be operated as a generator for producing current, in which case it can be driven by the traveling drive motor 4 or by the vehicle wheels. In addition, the other electric machine may be embodied as an electric starter motor for starting the vehicle travel drive motor 4 if the latter is an internal combustion engine.

In the embodiment shown, the intermediate drive train 12 in which the torque transmission device 16 is located contains a transmission input shaft 22 between the torque transmission device 16 and the drive gear mechanism 2, and a motor output shaft, for example crankshaft 24, between the vehicle travel drive motor 4 and the torque transmission device 16. A clutch 18 or 20 can be provided between at least one of these shafts 22 and 24, on the one hand, and the torque transmission device 16, on the other, depending on the type of drive device.

The oil pump 6 and/or the electric motor 8 extend around the intermediate drive train 12, preferably around the transmission input shaft 22.

According to preferred embodiments of the invention, the electric motor 8 has a larger external diameter than the oil pump 6. As a result, it can be positioned on different radii. According to a preferred embodiment, the oil pump 6 is arranged at least partially or completely in the axial and radial directions within the electric motor 8.

These features require particularly little installation space.

Figure 2:
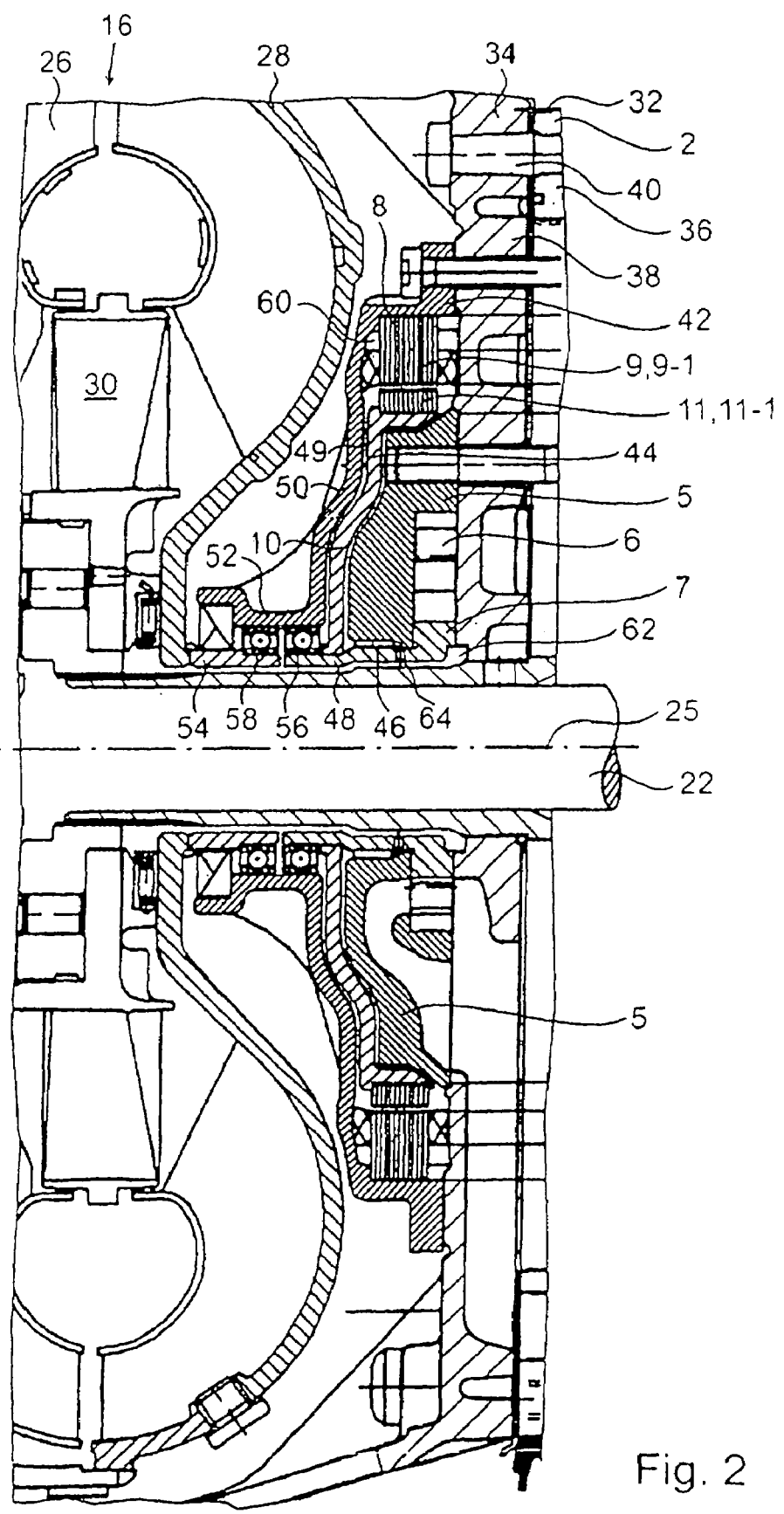
FIG. 2 is a partial longitudinal sectional view of a particular embodiment of the motor vehicle drive device according to the invention.
Figure 3:
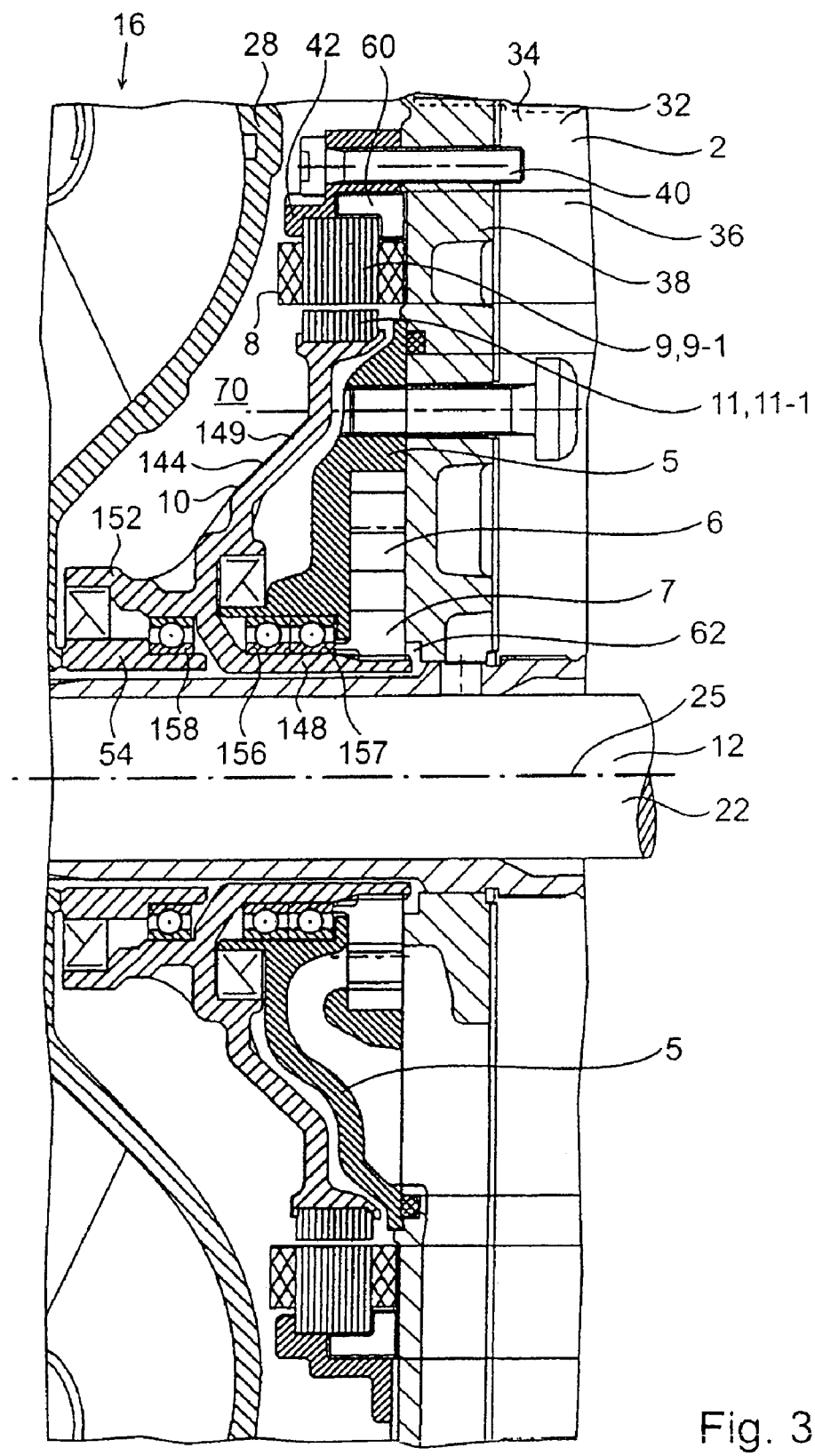
FIG. 3 is a longitudinal sectional view of another particular embodiment of a motor vehicle drive device according to the invention.

The embodiments of the invention according to FIGS. 2 and 3 may have all the features which have been described above with reference to FIG. 1. In FIGS. 2 and 3, parts corresponding to the parts in FIG. 1 have been provided with identical reference numbers.

In FIG. 2, the torque transmission device 16 is a hydrodynamic torque converter which is only partially illustrated and has, for example, a turbine wheel 26, a pump impeller wheel 28 and a stator 30. The pump impeller wheel 28 is connected, or can be connected, in terms of drive to the crankshaft 24 of the vehicle travel drive motor 4, and the turbine wheel 26 is connected, or can be connected, in terms of drive to the transmission input shaft 22 of the intermediate drive train 12 in FIG. 1. The torque converter 16 can be provided with a torque converter lockup clutch for bypassing the torque converter.

A drive housing may be embodied in one piece or two pieces. In the embodiments of the invention shown it is embodied in two pieces and is composed of a drive gear housing 32 containing the drive gear mechanism 2 and an add-on gear housing 34 containing the torque converter 16, the oil pump 6 and its electric motor 8. The two housings 32, 34 are screwed to one another at housing flanges 36 and 38 as shown schematically by a screw 40.

The pump housing 5 of the oil pump 6 and stator 9 of the electric motor 8 are arranged in the add-on gear housing 34 on the side of the add-on housing flange 38 facing away from the drive gear mechanism 2, and are attached to this flange 38.

The stator 9 of the electric motor 8 has an electromagnetically active part 9-1 which is accommodated in an electric motor housing 42 which is attached to the flange 38 of the add-on gear housing 34.

The rotor 11 has a rotor disk 44 which is flat or curved in the manner of a dish and at least partially forms the permanently closed drive connection 10 between the rotor 11 and the pump rotor 7 of the oil pump 6. The rotor disk 44 is fitted on its radially outer end with the electromagnetically active part 11-1 of the rotor 11 which interacts with the electromagnetic part 9-1 of the stator 9 electromagnetically in order to drive the rotor 11.

The rotor disk 44 is connected fixed in terms of rotation at its radially inner end to a hollow shaft part 48, or is embodied in one piece, which extends from an annular disk part 49 toward the rear to the pump rotor 7 to which it is permanently connected so as to be fixed in terms of rotation. The section of the hollow shaft part 48 which projects to the rear can be mounted radially on the pump housing 5 of the oil pump 6, either directly or by means of a bearing 46, for example a sliding bearing.

In the embodiment in FIG. 2, the electric motor housing 42 is provided with a stator disk 50 which is either formed in one piece with the electric motor housing 42 or is attached to it in a nonrotatable fashion and extends from the electromagnetically active stator part 9.1, either flat or curved in the manner of a dish, inwardly in the direction of the axis 25 of rotation. The stator disk 50 is provided at its radially inner end with a hollow shaft part 52 which extends forward in the direction from the pump housing 5 to the torque converter 16. This hollow shaft part 52 extends axially in the forward direction, in each case with a radial distance, over an end section of the hollow shaft part 48 which projects forward from the annular disk part 49 and over a hollow shaft part 54, extending in the opposite direction to the rear, of the pump impeller wheel 28 of the hydrodynamic torque converter 16. The rotor disk 44 and its hollow shaft part 48 are mounted radially on the hollow shaft part 52 of the stator disk 50 by means of a bearing 56, and the pump impeller wheel 28 of the torque converter 16 is mounted radially by means of a further bearing 58. The rotor disk 44 and thus the entire rotor 11 of the electric motor 8 is therefore supported at least radially, and when necessary also axially, both on the pump housing 5 of the oil pump 6 and on the stator disk 50, and thus on the stator 9.

According to another embodiment, the support 46 of the rotor disk 44 on the pump housing 5 can be dispensed with and the rotor disk 44 can be supported only on the stator disk 50.

According to another embodiment, instead of the described embodiment, the pump impeller wheel 28 can be rotatably supported on the radially outer circumferential face of the hollow shaft part 52 of the stator disk 50, or on the hollow shaft part 48 of the rotor disk 44 of the electric motor 8. A compact, small design is achieved with all the embodiments.

The electric motor housing 42 with the stator disk 50, on the one hand, and the pump housing 5 of the oil pump 6, on the other, form an oil chamber 60 between them. The electromagnetically active parts 9-1 and 11-1 of the stator 9 and of the rotor 11 are located in the radially outer region of the oil chamber 60. In the region of the oil chamber 60 which is located radially inside the latter, the rotor disk 44 extends between the pump housing 5 of the oil pump 6 and the stator disk 50 of the electric motor 8, in each case at a distance from them, so that in this region the oil chamber 60 is divided by the rotor disk 44 and a forward flow path and a return flow path for cooling oil are formed. This oil for cooling the electric motor 8 is preferably the oil of the oil pump 6 which is fed in and carried away at suitable points in the oil chamber 60.

An oil duct 62 leads from the oil pump 6 to the hydrodynamic torque converter 16 in order to supply it with oil. A side duct or bypass 64 can be branched off from this oil duct 62, for example at one or more points and oil from the oil pump 6 can flow via said side duct or bypass 64 and through the oil chamber 60 of the electric motor 8.

The rotor disk 44 preferably extends essentially parallel to the pump housing 5, beyond this pump housing at a distance, from the outside to the inside in the direction of the axis 25 of rotation. The stator disk 50 preferably extends essentially parallel to the rotor disk 44 at a distance from it, essentially from the outside to the inside in the direction of the axis 25 of rotation.

The electric motor 8 has a larger diameter in its radially outer end region, where the electromagnetically active parts 9-1 and 11-1 of the stator 9 and of the rotor 11 are located, than the oil pump 6. As a result, it is possible to arrange the oil pump 6 radially and axially completely within the electromagnetically active parts 9-1 and 11-1 of the rotor 11 and of the stator 9 of the electric motor 8, in accordance with FIGS. 2 and 3.

The embodiment from FIG. 3 has, in comparison with the embodiment from FIG. 2, the differences that the electric motor housing 42, and thus the stator 9, does not have a stator disk 50 which extends inward from it. An oil chamber 60 is not provided but instead the electric motor 8 is arranged in an oil-free air space 70. The latter is located between the flange 38 of the add-on housing 34 and the torque converter 16.

The rotor 11 from FIG. 3 is provided with a rotor disk 144 which extends inward from the electromagnetically active rotor part 11-1 of said rotor, in the direction of the axis 25 of rotation, and at least partially forms the drive connection 10. The rotor disk 144 has an annular disk part 149 at whose radially inner region an axially hollow shaft part 148 which extends rearward to the pump rotor 7 and which is connected to the pump rotor 7 so as to be fixed in terms of rotation, and a front hollow shaft part 152 which extends forward, axially away in the opposite direction, are provided.

The rear hollow shaft part 148 which is connected to the pump rotor 7 so as to be fixed in terms of rotation is rotatably supported on the pump housing 5 in the radial direction and when necessary also in the axial direction by means of one or more bearings 156 and 157. These bearings 156 and 157 are located between an external circumferential face of the rear hollow shaft part 148 and an internal circumferential face of the pump housing 5.

The annular disk part 149 and the two hollow shaft parts 148 and 152 are preferably a single-piece component.

The pump impeller wheel 28 of the hydrodynamic torque converter 16 is rotatably supported in the radial direction and when necessary also in the axial direction on the hollow shaft part 152, extending forward in the direction of the torque converter 16, of the rotor disk 158 by means of at least one bearing 158. The bearing 158 is preferably located between an internal circumferential face of the forward-projecting hollow shaft part 152 and an external circumferential face of the rearward-projecting hollow shaft part 54 of the pump impeller wheel 28.

Insofar as no differences are described here, FIG. 3 corresponds to the embodiment from FIG. 2 so that the description of FIG. 2 also applies to it.

As already mentioned with respect to FIG. 1, instead of a torque converter 16 it is also possible to provide a clutch if the transmission 2 is not an automatic transmission but rather a manually shiftable or automatic gearbox. For all the embodiments, it is also possible to arrange an electric machine or a plurality of electric machines in the axial space between the vehicle travel drive motor 4 (not shown in FIGS. 2 and 3) and the region in which the electric motor 8 and the oil pump 6 are arranged, and the electric machine or machines can form a hybrid drive together with the vehicle travel drive motor 4 and/or be used as generators and as a starter motor for starting the vehicle travel drive motor 4 if the latter is an internal combustion engine. According to a different embodiment the vehicle travel drive motor 4 could also be an electric motor.

The invention is not restricted to a specific type of bearings. The bearings may be, for example, sliding bearings, ball bearings, roller bearings etc.

In all the embodiments, the electric motor 8 is independent of the vehicle travel drive train and its torques.

What is claimed is:

1. A motor vehicle drive arrangement, comprising a motor vehicle drive gear mechanism (2) with a variable transmission ratio for transmitting torque in a drive train between a vehicle travel drive motor (4) and at least one motor vehicle wheel, an oil pump (6) for supplying the drive gear mechanism (2) with pressurized oil for operating shifting elements and for cooling the drive gear mechanism (2), and an electric motor (8) for driving the oil pump (6) with permanent drive connection (10) between the electric motor (8) and the oil pump (6), and neither the electric motor (8) nor the oil pump (6) having a mechanical drive connection to the torque transmission path of the vehicle drive train, the oil pump (6) and its electric motor (8) being arranged on the transmission input side of the drive gear mechanism (2), and a space (14) being provided between the arrangement of the oil pump (6) and of its electric motor (8) and the vehicle travel drive motor (4), said space (14) including a torque transmission device (16) for transmitting torque between the vehicle travel drive motor (4) and the torque transmission device (16) and the travel drive gear mechanism (2), the torque transmission device (16) including at least one of the elements comprising a clutch (18, 20), a torque converter and at least one further electric machine, positioned in the space (14), the oil pump (6) and its electric motor (8) being disposed around a transmission input shaft (22) of the vehicle travel drive train extending to the drive gear mechanism (2), with its rotor (11) being arranged in a housing (42) in an oil chamber (60) through which oil from the oil pump (6) is conducted, the oil chamber (60) being delimited by the electric motor housing (42) and by the pump housing (5), and the rotor (11) of the electric motor (8) extending between these two housings and being spaced from the two housings so that oil passages are formed between the rotor (11) and the two housings (42, 5).

2. The motor vehicle drive device as claimed in claim 1, wherein the oil pump (6) is accommodated in a housing (32, 34) which contains part of the vehicle travel drive train.

3. The motor vehicle drive device as claimed in claim 2, wherein the housing (32, 34) includes the drive gear mechanism (2).

4. The motor vehicle drive device as claimed in claim 3, wherein the drive gear mechanism (2) is an automatic transmission, and the housing (32, 34) includes a torque converter (16) of the automatic transmission.

5. The motor vehicle drive device as claimed in claim 1, wherein the oil pump (6) and the electric motor (8) surround the transmission input shaft (22) of the drive gear mechanism (2).

6. The motor vehicle drive device as claimed in claim 1, wherein the electric motor (8) is provided with a stator (9) and a stationary electric motor housing (42).

7. The motor vehicle drive device as claimed in claim 6, wherein the electric motor housing (42) has at least one bearing structure (52) for supporting at least one rotatable element (28, 11).

8. The motor vehicle drive device as claimed, in claim 7, wherein a rotor (11) of the electric motor (8) is rotatably supported on the bearing structure (52).

9. The motor vehicle drive device as claimed in claim 7, wherein the rotatable element (28) of a torque converter (16) is rotatably supported on the bearing structure (52).

10. The motor vehicle drive device as claimed in claim 1, wherein the oil pump (6) has a stationary pump housing (5).

11. The motor vehicle drive device as claimed in claim 10, wherein the rotor (11) of the electric motor (8) is rotatably supported on the pump housing (5).

12. The motor vehicle drive device as claimed in claim 6, wherein at least part of the stator (9) of the electric motor (8) delimits the oil chamber (60) so that the oil of the oil pump (6) flows along this part of the stator (9).

13. The motor vehicle drive device as claimed in claim 12, wherein the stator (9) of the electric motor (8) is provided with at least one cooling oil duct (62) through which oil from the oil pump (6) is conducted in order to cool the electric motor (8).

14. The motor vehicle drive device as claimed in claim 1, the electric motor (8) has a larger external diameter than the oil pump (6), and the oil pump (6) is arranged at least partially axially and radially within the electric motor 8.

15. The motor vehicle drive device as claimed in claim 1, wherein the oil supply of the oil chamber (60) is branched off from an oil line (62) which extends between the oil pump (6) and the torque converter (16).

16. The motor vehicle drive device as claimed in claim 1, wherein the rotor (11) of the electric motor (8) is rotatably supported on the stationary pump housing (5).

17. The motor vehicle drive device as claimed in claim 16, wherein a rotation member (28) of a torque converter (16) is mounted on the rotor (11) of the electric motor (8) so as to be rotatable relative thereto.

* * * * *